(12) United States Patent
Choi

(10) Patent No.: US 9,475,368 B2
(45) Date of Patent: Oct. 25, 2016

(54) SLIDING DOOR DEVICE FOR VEHICLE

(71) Applicant: HYUNDAI MOTOR COMPANY, Seoul (KR)

(72) Inventor: Jae Hong Choi, Hwaseong-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 0 days.

(21) Appl. No.: 14/824,963

(22) Filed: Aug. 12, 2015

(65) Prior Publication Data

US 2016/0129769 A1    May 12, 2016

(30) Foreign Application Priority Data

Nov. 6, 2014  (KR) .................. 10-2014-0153529

(51) Int. Cl.

| E05F 11/00 | (2006.01) |
|---|---|
| B60J 5/04 | (2006.01) |
| E05C 3/12 | (2006.01) |
| E05B 85/24 | (2014.01) |
| E05B 83/38 | (2014.01) |
| B60J 5/06 | (2006.01) |
| E05B 83/40 | (2014.01) |

(52) U.S. Cl.
CPC ............. *B60J 5/0479* (2013.01); *B60J 5/047* (2013.01); *B60J 5/06* (2013.01); *E05B 83/38* (2013.01); *E05B 83/40* (2013.01); *E05B 85/24* (2013.01); *E05C 3/124* (2013.01)

(58) Field of Classification Search
CPC ........... E60J 5/0479; E60J 5/06; E60J 5/047; E05B 83/40; E05B 83/38; E05B 83/24; E05C 3/124

USPC .............................................. 49/360; 296/155
See application file for complete search history.

(56) References Cited

U.S. PATENT DOCUMENTS

| 4,110,934 | A | * | 9/1978 | Zens ............................... 49/218 |
|---|---|---|---|---|
| 4,502,246 | A | * | 3/1985 | Minami ......................... 49/322 |
| 4,640,050 | A | * | 2/1987 | Yamagishi et al. ............. 49/280 |
| 5,896,704 | A | * | 4/1999 | Neag et al. ..................... 49/209 |
| 6,036,257 | A | * | 3/2000 | Manuel ......................... 296/155 |
| 6,321,488 | B1 | * | 11/2001 | Bigoszewski et al. ......... 49/358 |
| 6,328,374 | B1 | * | 12/2001 | Patel ............................ 296/155 |
| 6,530,619 | B2 | * | 3/2003 | Fukumoto et al. ........... 296/155 |
| 6,826,869 | B2 | * | 12/2004 | Oberheide ...................... 49/360 |
| 7,003,915 | B2 | * | 2/2006 | Yokomori ...................... 49/360 |

(Continued)

FOREIGN PATENT DOCUMENTS

| JP | 2007-216726 A | 8/2007 |
|---|---|---|
| KR | 10-1998-0069736 A | 10/1998 |
| KR | 10-2015-0077000 A | 7/2015 |

*Primary Examiner* — Jerry Redman
(74) *Attorney, Agent, or Firm* — McDermott Will & Emery LLP

(57) ABSTRACT

A sliding door device for a vehicle includes a front door or a rear door. A central rail is mounted on the front door or the rear door. A central slider is coupled to the central rail. A lower rail is mounted on a lower side of the vehicle. A lower slider is coupled to the lower rail to move along the lower rail. A central support structure has one end connected to the central slider and another end mounted on the vehicle to support the sliding movement of the central slider. A lower support structure has one end coupled to the lower slider and another end connected to a lower portion of the front door or the rear door to support the lower portion of the front door or the rear door. A hook locks and releases the central support structure to and from the central rail.

16 Claims, 13 Drawing Sheets

(56) References Cited

U.S. PATENT DOCUMENTS

| | | | |
|---|---|---|---|
| 7,654,608 B2* | 2/2010 | Krajenke et al. | 296/155 |
| 7,856,759 B2* | 12/2010 | Elliott et al. | 49/358 |
| 8,122,644 B2* | 2/2012 | Jarolim | 49/209 |
| 8,282,156 B1* | 10/2012 | Thiele et al. | 296/207 |
| 8,336,259 B2* | 12/2012 | Ishida et al. | 49/358 |
| 8,336,949 B2* | 12/2012 | Boettcher | 296/155 |
| 8,353,555 B2* | 1/2013 | Boettcher | 296/155 |
| 8,807,626 B2* | 8/2014 | Kwon et al. | 296/155 |
| 2004/0070231 A1* | 4/2004 | Yogo et al. | 296/155 |
| 2004/0155617 A1* | 8/2004 | Suzuki | 318/434 |
| 2008/0072497 A1* | 3/2008 | Oxley | 49/360 |
| 2008/0129085 A1* | 6/2008 | Kim et al. | 296/155 |
| 2008/0190028 A1* | 8/2008 | Oxley | 49/360 |
| 2011/0126466 A1* | 6/2011 | Adachi et al. | 49/262 |
| 2014/0026487 A1* | 1/2014 | Maruyama et al. | 49/176 |
| 2014/0046551 A1* | 2/2014 | Ojima et al. | 701/49 |
| 2014/0075843 A1* | 3/2014 | Maruyama et al. | 49/177 |

* cited by examiner

SLIDING DOOR DEVICE FOR VEHICLE

CROSS-REFERENCE TO RELATED APPLICATION

This application claims the benefit of priority to Korean Patent Application No. 10-2014-0153529 filed in the Korean Intellectual Property Office on Nov. 6, 2014, the entire content of which is incorporated herein by reference.

TECHNICAL FIELD

The present disclosure relates to a sliding door device for a vehicle. More particularly, the present disclosure relates to a sliding door device for a vehicle capable of opening and closing a vehicle door by sliding a longitudinal direction of the vehicle.

BACKGROUND

An interior space of a vehicle has a predetermined size to accommodate a driver and passengers. The driver and passengers can enter the interior space of the vehicle by opening and closing doors which are installed at a vehicle body.

In a passenger vehicle, the doors for opening and closing the vehicle interior space may have a front door disposed at a front side in a longitudinal direction of the vehicle and a rear door disposed at a rear side in the longitudinal direction of the vehicle. The front door and the rear door are installed at the vehicle body to rotate via a hinge.

In a van which can transport more people, doors open and close an interior space with sliding movement forward and reward in a longitudinal direction of the van.

The sliding doors open the interior space by moving rearward in the longitudinal direction of the van and close the interior space by moving forward along the longitudinal direction of the van, thus fully opening the doors installed at the vehicle body even in a small opening and closing space.

However, the sliding doors for opening and closing the vehicle interior space require three supporting and guiding rails for supporting an upper portion, a middle portion and a lower portion of the doors and related components, thereby increasing the number of parts and the weight of the vehicle and decreasing the design freedom of the vehicle.

The above information disclosed in this Background section is only for enhancement of understanding of the background of the disclosure, and therefore, it may contain information that does not form the prior art that is already known in this country to a person of ordinary skill in the art.

SUMMARY

The present disclosure has been made in an effort to provide a sliding door device for a vehicle having advantages of opening and closing a front door and/or a rear door of a vehicle in a sliding manner forward and rearward in a longitudinal direction of the vehicle, thereby easily opening and closing the front door and/or the rear door even in a small space, reducing the number of parts, weight and cost of the vehicle by stably supporting the front door and the rear door with only two rails, and improving exterior design freedom of the vehicle.

A sliding door device for a vehicle according to an exemplary embodiment of the present inventive concept may include a front door and/or a rear door configured to be open closed. A central rail is mounted on the front door and/or the rear door and straightly extends in a length direction of the vehicle. A central slider is coupled to the central rail to support the central rail and to move along the central rail. A lower rail is mounted on a lower side of the vehicle and straightly extends in the length direction of the vehicle. A lower slider is coupled to the lower rail to move along the lower rail. A central support structure has one end connected to the central slider and another end mounted to the vehicle to support the sliding movement of the central slider. A lower support structure has one end coupled to the lower slider and another end connected to a lower portion of the front door and/or the rear door to movably support the lower portion of the front door and/or the rear door. A hook locks and releases the central support structure to and from the central rail.

Each of the central rail and the lower rail may include a rail body having a rectangular plate shape. Two guide rails extend in a longitudinal direction along both edges of the central and lower rails and perpendicularly protruding from the rail body toward an interior of the vehicle.

Each of the two guide rails may have a circular cross section.

The lower rail may be mounted to the lower side of the vehicle body through a rail supporter.

The central slider may include a slider body having a rectangular block shape into and to which a guide rail of the central rail is inserted and coupled. A roller is rotatably inserted into the slider body and exposed to outside from one side of the slider body. The roller surface-contacts the guide rail of the central rail and moves the slide body along the guide rail.

The central slider may be mounted in pair at an upper portion and a lower portion of the central rail, respectively, and integrally move with a central slider mounting bracket. The central support structure may include a vehicle body mounting bracket fixedly mounted on the vehicle. A swing arm has one end rotatably engaged to the vehicle body mounting bracket and another end rotatably engaged to the central slider mounting bracket.

The swing arm may include an upper swing arm formed at an upper portion of the swing arm and a lower swing arm formed at a lower portion of the swing arm. Two flanges have a rectangular plate shape and connect both edges of the upper swing arm and the lower swing arm. One of the two flanges may press the hook down.

The upper swing arm and the lower swing arm have an assembling hole formed at both ends thereof, respectively. The central slider mounting bracket has two fastening flanges inserted between and rotatably coupled to the upper swing arm and the lower swing arm.

The vehicle body mounting bracket may have a "U"-shaped cross section formed by an upper flange, a lower flange, and a side flange which connects the upper flange and the lower flange. The side flange of the vehicle body mounting bracket includes at least one penetrative assembling hole and is mounted on the vehicle through the at least one penetrative assembling hole. The upper flange and the lower flange of the vehicle body mounting bracket include a penetrative assembling hole, respectively, such that a first pin is inserted into the penetrative assembling holes of the upper and lower flanges of the vehicle body mounting bracket and the assembling holes of the upper and lower swing arms to rotatably couple one end of the swing arm with the vehicle body mounting bracket.

An elastic spring may be interposed between the vehicle body mounting bracket and the swing arm to return the swing arm to its original position after rotating on the vehicle body mounting bracket.

The hook may include a hook body and a hanger which is formed at one end of the hook body to removably hook onto the central rail. The hook may be rotatably coupled to the swing arm and the central slider mounting bracket through a fastening pin.

The lower support structure may include a gear device mounted at the lower slider. A linkage has one end connected to the gear device and another end connected to the front door and/or the rear door.

The gear device may include a rack gear mounted at the lower rail; a gear shaft; and a planetary gear box through and into which the gear shaft penetrates and is inserted to be coupled thereto. An input gear is coupled to an upper portion of the gear shaft to integrally rotate, and an output gear is coupled to a lower portion of the gear shaft to integrally rotate and be meshed with the rack gear. A transmission gear is meshed with the input gear, mounted at the linkage, and has an arc shape.

The linkage may include a first link having a "U"-shaped cross section and one end thereof engaged with the transmission gear. A second gear has one end connected to another end of the first link, and another end of the second gear is engaged with the lower portion of d the front door and/or the rear door.

The first link and the second link may include an upper flange and a lower flange having a penetrative assembling hole, respectively. A side flange connects the upper flange and the lower flange and has a "U"-shaped cross section.

The front door and the rear door may have lower edges formed with an engaging boss fastened with the other end of the second link, respectively.

The other end of the first link and the one end of the second link may be integrally fastened with a first drum. The one end of the first link and the transmission gear may be integrally fastened with a second drum. The first drum and the second drum may be connected to each other via a belt or chain to transmit rotating movement.

The first link includes a third drum, through which the belt or chain passes.

The first drum has a diameter smaller than that of the second drum. The planetary gear box configured to vary an output revolution of the output gear by increasing about up to 8 to 12 times.

According to a sliding door device for a vehicle of an exemplary embodiment of the present inventive concept, the front door and the rear door may slide in the longitudinal direction of the vehicle through a central rail installed on the front door and the rear door and a lower rail mounted on the vehicle body, thereby easily opening and closing the front door and the rear door even when an opening and closing space is small.

Further, an upper rail and related components are not required, thereby reducing the number of parts, weight, and cost of the vehicle, improving the design freedoms, and preventing deterioration of esthetic effect of the vehicle.

Furthermore, the front door and the rear door can smoothly slide along the central rail and the lower rail after the front door and the rear door stably pivot outwardly at predetermined angle, such that the opening and closing operation may be smoothly and stably achieved.

DETAILED DESCRIPTION OF THE EMBODIMENTS

Hereinafter, an exemplary embodiment of the present inventive concept will be described in detail with reference to the accompanying drawings.

Figure 1:
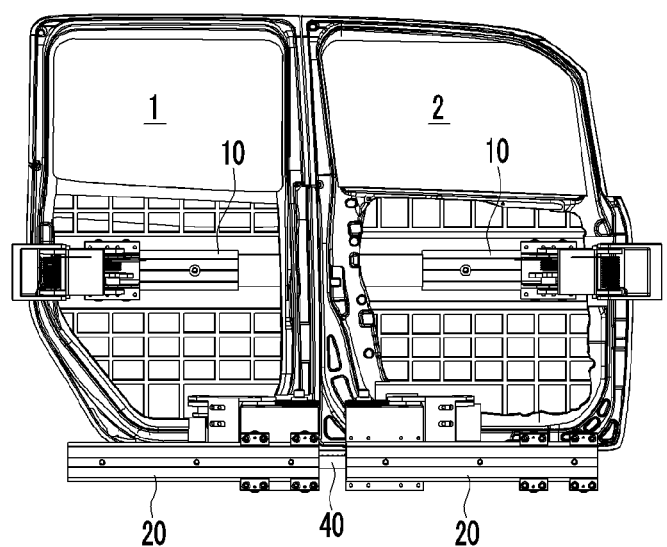
FIG. 1 is a perspective view of a sliding door device for a vehicle in a fully closed state according to an exemplary embodiment of the present inventive concept.

Referring to FIG. 1, a sliding door device for a vehicle according to an exemplary embodiment of the present inventive concept may include a front door 1 and a rear door 2 opening and closing a door opening formed at a vehicle body. The front door 1 may be disposed in front in a longitudinal direction of the vehicle to open and close a front door opening formed at the vehicle body. The rear door 2 may be disposed at the back in the longitudinal direction of the vehicle to open and close a rear door opening formed at the vehicle body.

FIG. 1 is a front of an inside of a vehicle in a state in which the front door 1 and the rear door 2 fully close the front door opening and the rear door opening, respectively.

Figure 2:
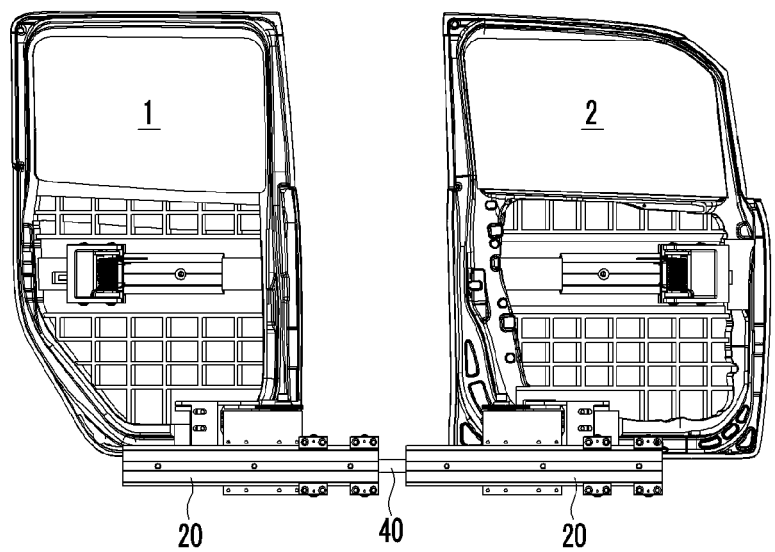
FIG. 2 is a perspective view of the sliding door device for a vehicle in a medium open state according to an exemplary embodiment of the present inventive concept.

Referring to FIG. 2, the front door 1 may slide toward the front in the longitudinal direction of the vehicle to open the front door opening, and the rear door 2 may slide toward the back in the longitudinal direction of the vehicle to open the rear door opening.

Figure 3:
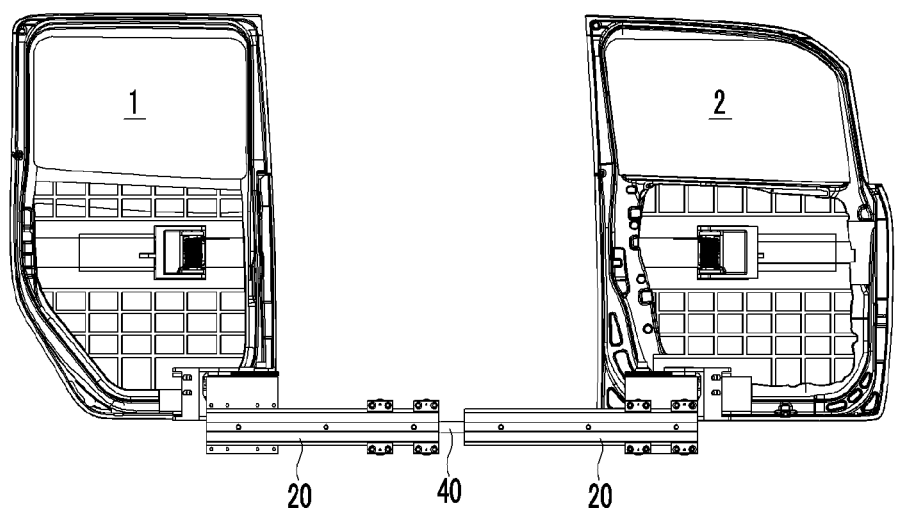
FIG. 3 is a perspective view of a sliding door device for a vehicle in a fully opened state according to an exemplary embodiment of the present inventive concept.

FIG. 3 shows a state in which the front door 1 slidingly moves toward the front in the longitudinal direction of the vehicle to fully open the front door opening, and the rear door 2 slidingly moves toward the back in the longitudinal direction of the vehicle to fully open the rear door opening.

A central rail 10 may extend longitudinally and be integrally mounted on inner surfaces of the front door 1 and the rear door 2, respectively.

The central rail 10 may be mounted on middle portions of the inner surfaces and extend forward and rearward in the longitudinal direction of the vehicle.

Figure 4:
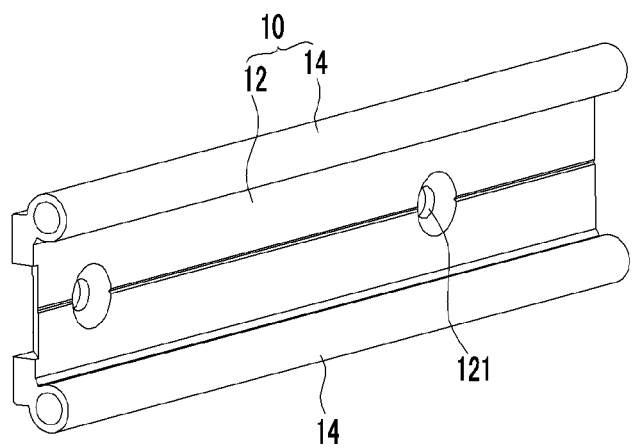
FIG. 4 is a perspective view of a central rail according to an exemplary embodiment of the present inventive concept.
Figure 5:
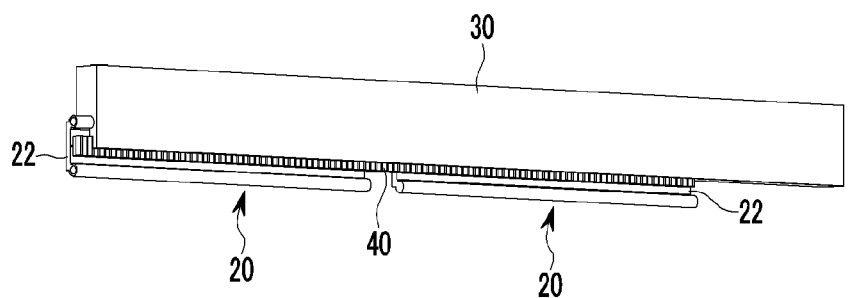
FIG. 5 is a perspective view showing a coupled state of a lower rail, a rail supporter, and a rack gear according to an exemplary embodiment of the present inventive concept.

Referring to FIG. 4, the central rail 10 may include a rail body 12 having a rectangular plate shape, two guide rails 14 extending in the longitudinal direction along both edges of the rail body 12 and protruding toward the interior of the vehicle.

The two guide rails 14 may have a circular cross section.

The rail body 12 may have two penetrating mounting holes 121 spaced apart from each other along the longitudinal direction.

The mounting holes 121 may be assembled at the front door 1 and the rear door 2 via a bolt and the like.

Referring to FIG. 1, two lower rails 20 extending longitudinally may be mounted at the vehicle body corresponding to each of the central rails 10 of the front door 1 and the rear door 2. The two lower rails 20 may extend forward and rearward in the longitudinal direction of the vehicle. The two lower rails 20 may have the same shape as the central rail 10. The two lower rails 20 may be mounted at the vehicle body with a rail supporter 30 which has a rectangular block shape.

A rack gear 40 may be mounted on rail bodies 22 of the two lower rails 20, respectively. The rack gear 40 may be coupled to the two lower rails 20 to connect the two lower rails 20. The rack gear 40 may be coupled to the rail supporter 30 to insert a portion of the rack gear 40 into the rail supporter 30.

The rack gear 40 may include a plurality of gears spaced apart from each other in a longitudinal direction thereof. The plurality of gears may face the front door 1 and the rear door 2 (outside along the width direction of vehicle).

Figure 6:
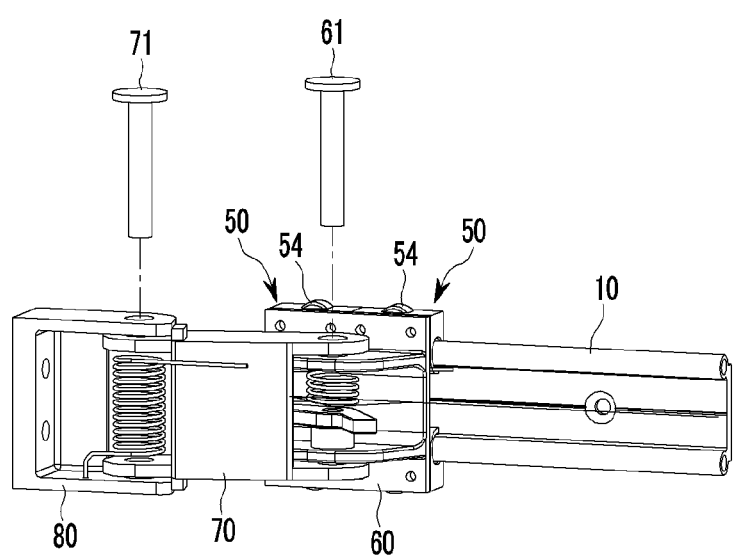
FIG. 6 is a perspective view of a central support structure according to an exemplary embodiment of the present inventive concept.
Figure 7:
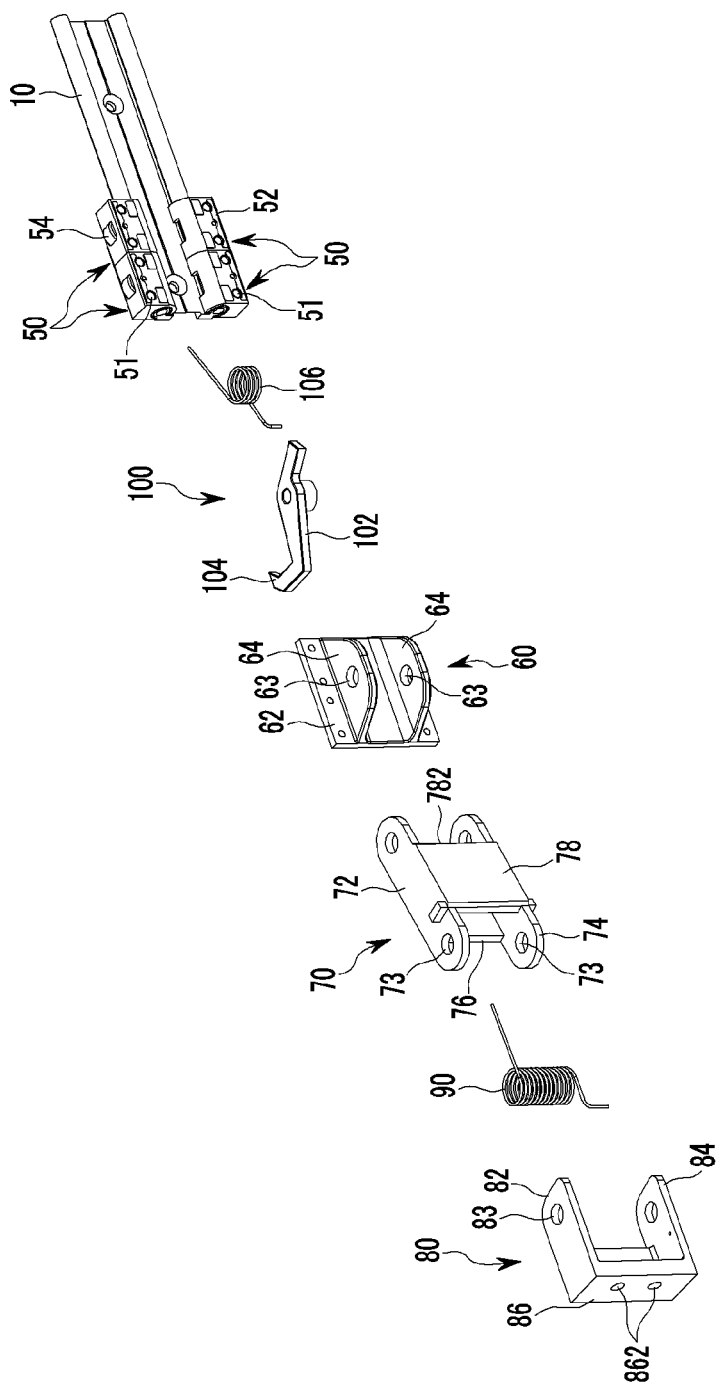
FIG. 7 is an exploded perspective view of the central support structure according to an exemplary embodiment of the present inventive concept.

Referring to FIG. 6 and FIG. 7, one end of a central support structure may be fastened to the central rail 10 to rotate, another end of the central support structure may be fixedly mounted to the vehicle body. The central rail 10, the front door 1, and the rear door 2 may be supported by the vehicle body to rotate and slide by the central support structure. The central support structure may include a central slider 50, a central slider mounting bracket 60, a swing arm 70, and a vehicle body mounting bracket 80.

The central slider 50 may be connected to the central rail 10 to move along the central rail 10. The central slider mounting bracket 60 may be fastened to one end of the swing arm 70 through a first pin 61, and another end of swing arm 70 may be fastened to the vehicle body mounting bracket 80 via a second pin 71 as shown in FIG. 6. The vehicle body mounting bracket 80 may be fixedly mounted to the vehicle body.

The central slider 50 may be provided in a pair at an upper portion and at a lower portion of the central rail 10, respectively, as shown in FIG. 7. The upper pair of central slider 50 and the lower pair of the central slider 50 may be mounted to the central slider mounting bracket 60 to integrally move.

The central slider 50 may have a rectangular block shape and coupled to the guide rail 14 of the central rail 10 to insert the guide rail 14 of the central rail 10 therein. The central slider 50 may include a slide body 52 having an assembling hole 51 for fastening the central slider mounting bracket 60. A roller 54 is rotatably inserted inside of the central slider 50 surface-contacts and rolls along the guide rail 14 of the central rail 10.

The central slider mounting bracket 60 may include a central slider mounting bracket body 62 having a rectangular plate shape and fastened to the assembling hole formed at the slide body 52 of the central slider 50. Two fastening flanges 64 protrude integrally from the central slider mounting bracket body 62 in a vertical direction. The two fastening flanges 64 may be formed with a penetrative assembling hole 63.

An upper swing arm 72 of the swing arm 70 disposed at an upper portion thereof, and a lower swing arm 74 disposed at a lower portion thereof. The swing arm 70 further includes two flanges 76 and 78 having a rectangular plate shape and connecting to both edges of the upper swing arm 72 and the lower swing arm 74.

The one flange 78 may have a pressing edge 782 which presses and rotates a hook which will be described later.

Both edges of the upper swing arm 72 and the lower swing arm 74 may have penetrative assembling holes 73.

The two fastening flanges 64 of the central slider mounting bracket 60 are inserted between the swing arm 72 and the lower swing arm 74. The first and second pins are inserted into each of the assembling holes of the upper swing arm 72 and the lower swing arm 74 and the assembling holes of two fastening flanges 64 of the central slider mounting bracket 60, such that the swing arm 70 is rotatably coupled to the central slider mounting bracket 60.

The vehicle body mounting bracket 80 may have a "U"-shaped cross section by an upper flange 82, a lower flange 84, and a side flange 86 which connects the upper flange 82 and the lower flange 84.

The side flange 86 may include at least one penetrative assembling hole 862 to be fixed to the vehicle body.

The upper flange 82 and lower flange 84 may have a penetrative assembling hole 83, respectively to insert a portion of the swing arm 70 therebetween and to rotatably fasten by inserting the first and second pins in the penetrative assembling hole.

In order to return the swing arm 70 to its original position after being rotated, an elastic spring 90 may be provided between the vehicle body mounting bracket 80 and the swing arm 70.

That is, one end of the elastic spring 90 may be connected to the vehicle body mounting bracket 80 and another end thereof may be connected to the swing arm 70, such that the elastic spring 90 may be twisted or released according to rotational movement of the swing arm 70.

A hook 100 may be rotatably mounted between the fastening portion of the swing arm 70 and the central slider mounting bracket 60.

The hook 100 may be rotatably mounted through the fastening pin 61 of the swing arm 70 and the central slider mounting bracket 60. The hook 100 may include a hook body 102 through which the fastening pin penetrates, and a hanger 104 formed at an end portion of the hook body 102. An elastic spring 106 may be provided to return the hook 100 to its original position after being rotated and to stably maintain a locked state of the hook 100 to the central rail 10.

Figure 8:
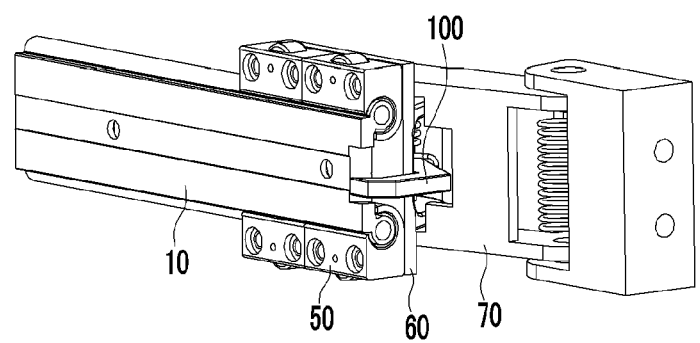
FIG. 8 is a perspective view showing a coupled stat of the central support structure and a hook thereof according to an exemplary embodiment of the present inventive concept.

Referring to FIG. 8, when the front door 1 and the rear door 2 are closed, the hanger 104 of the hook 100 is hung at the central rail 10 mounted at the front door 1 and the rear door 2, respectively, to fix the central slider mounting bracket 60, the central slider 50, and central rail 10 and to move integrally.

Figure 9:
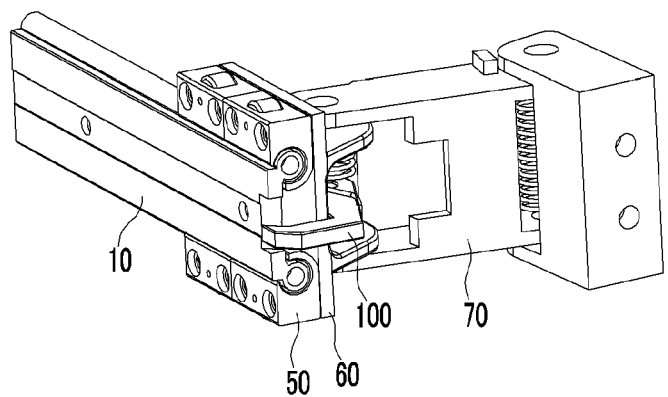
FIG. 9 is a perspective view showing a state that the hook releases the central support structure in FIG. 8.

Referring to FIG. 9, if the front door 1 and the rear door 2 rotate in a direction of opening the door opening, the swing arm 70 rotates together to press and rotate the hook 100. When the rotation of the front door 1 and the rear door 2 is completed, the hanger 104 of the hook 100 is separated from the central rail 10, such that the central rail 10 may slidingly move with the central slider 50.

Figure 10:
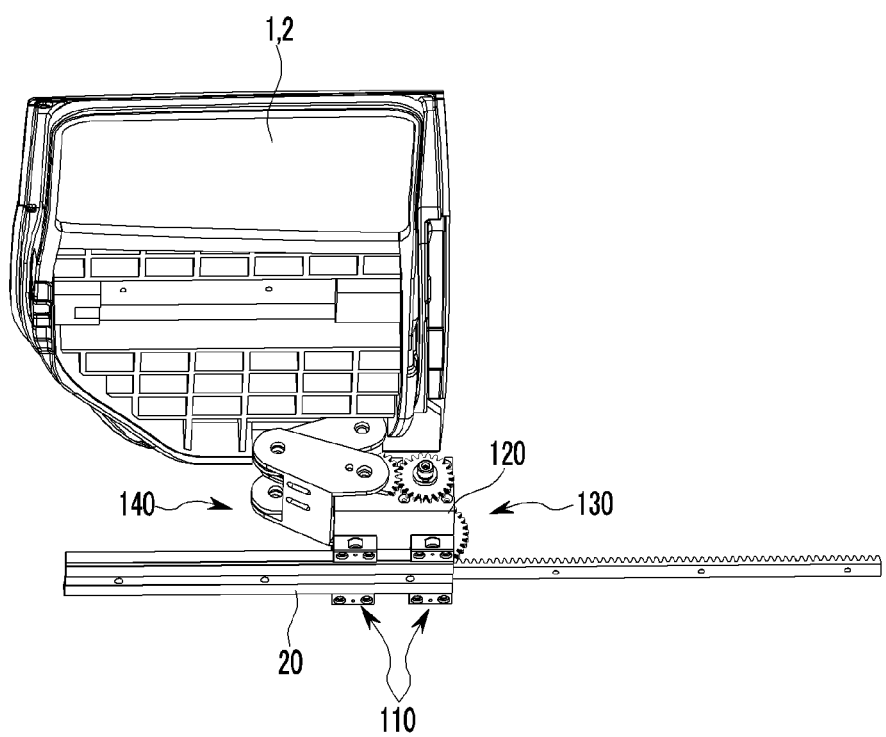
FIG. 10 is a perspective view showing a coupled state of a lower support structure and a door for a vehicle according to an exemplary embodiment of the present inventive concept.
Figure 11:
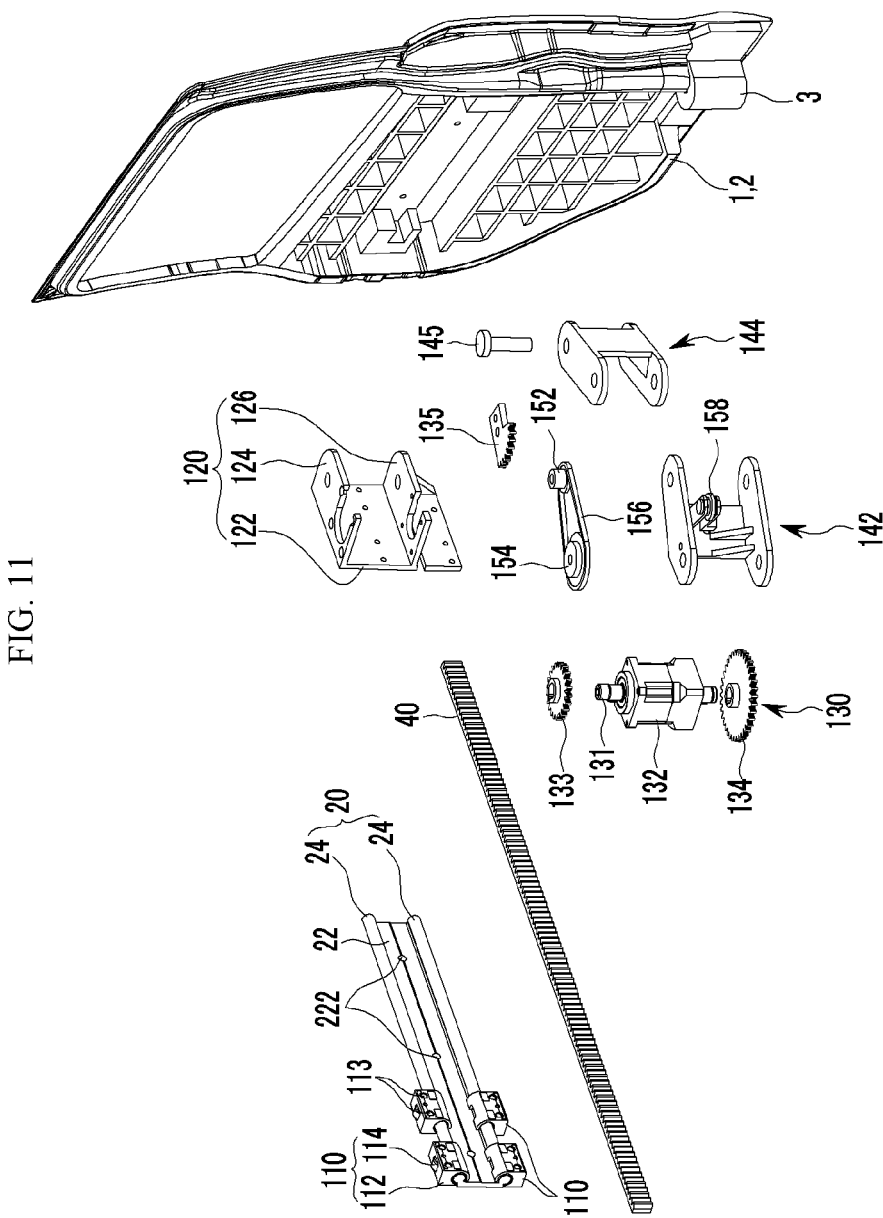
FIG. 11 is an exploded perspective view of a lower support structure according to an exemplary embodiment of the present inventive concept.
Figure 12:
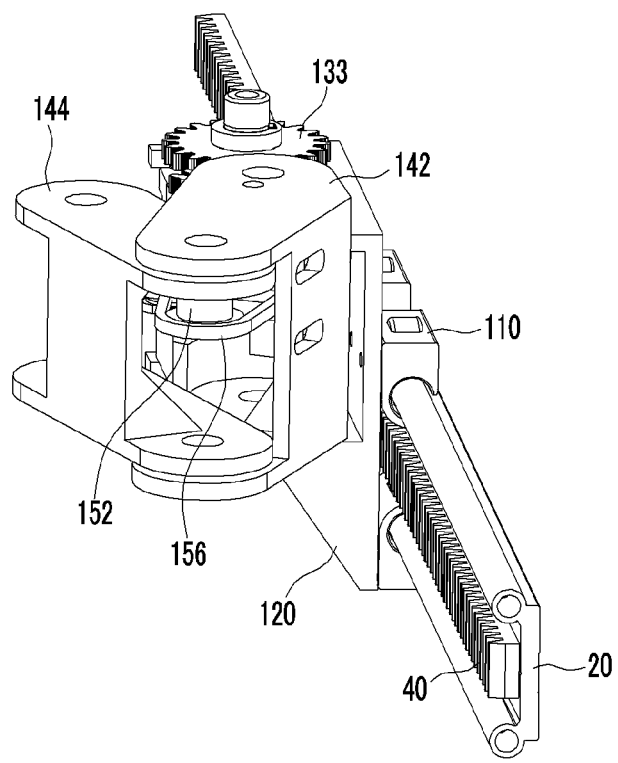
FIG. 12 is a perspective view of the lower support structure according to an exemplary embodiment of the present inventive concept.

Referring to FIGS. 10 to 12, a lower portion of the front door 1 and/or the rear door 2 may rotate while being supported by a lower support structure of vehicle doors, and further may move along the lower rail 20.

One end of the lower support structure may be fastened to the front door 1 and/or the rear door 2, and another end thereof may be coupled to the lower rail 20.

The lower support structure may include a lower slider 110 couple to and moving along the lower rail 20, a gear device 130 mounted at the lower slider 110, and a linkage 140 having one end fastened to the gear device 130 and another end fastened to the front door 1 and/or the rear door 2.

The lower rail 20 may include the rail body 22 having a rectangular plate shape, and two guide rails 24 extending in the longitudinal direction along both edges of the lower rail 20 and protruding toward the interior of the vehicle.

The two guide rails 24 have circular cross sections, respectively. The rail body 22 may have a plurality of penetrative mounting holes 222 spaced apart from each other in the longitudinal direction of the lower rail 20. The mounting holes 222 may assemble the lower rail 20 to the rail supporter 30 via bolts and the like.

The lower slider 110 may have a pair at an upper portion and at a lower portion of the lower rail 20, respectively. The upper pair of the lower slider 110 may be inserted inside the rail supporter 30 to move, and the lower pair of the lower slider 110 may be mounted on the lower slider mounting bracket 120 to be moved together.

The lower slider 110 may have a rectangular block shape and be coupled to the guide rail 24 of the lower rail 20 in which the guide rail 24 is inserted into the lower slider 110. The lower slider 110 may include a slider body 112 having an assembling hole 113 for fastening to a lower slider mounting bracket 120. A roller 114 is rotatably inserted inside of the slider body 112 to roll along the guide rail 24 and to surface-contact the guide rail 24 of the lower rail 20.

The lower slider mounting bracket 120 may include a bracket body 122 with which the lower slider 110 is engaged. An upper flange 124 and a lower flange 126 extend perpendicularly from the bracket body 122.

The upper flange 124 and the lower flange 126 may have mounting holes formed inwardly, and the bracket body 122 may have a long hole.

The gear device 130 may include a planetary gear box 132 into which a gear shaft 131 penetrates and coupled. An input gear 133 is coupled to an upper portion of the gear shaft 131 to integrally rotate. An output gear 134 is coupled to a lower portion of the gear shaft 131 to integrally rotate and be meshed with the rack gear 40. A transmission gear 135 is meshed with the input gear 133, mounted on the linkage 140, and has a circular arc shape. A planetary gear may be built in the planetary gear box 132 and increase an input revolution about up to 8 to 12 times to output it.

The linkage 140 may include a first link 142, one end of which is coupled to the transmission gear 135, having a "U"-shaped cross section. Another end of the first link 142 is engaged to one end of a second link 144, and another end of the second link 144 is engaged to the lower portions of the front door 1 and the rear door 2, respectively.

The first link 142 and the link 144 may each include an upper flange and a lower flange which may form a "U"-shaped cross section when compressed with penetrative assembling holes, and a connecting flange connecting the upper flange and the lower flange.

The lower edges of the front door 1 and the rear door 2 may protrude by an engaging boss 3 to which the other end of the second link 144 is engaged via a third pin 145.

A first drum 152 may be integrally engaged to an engagement portion of the other end of the first link 142 and one end of the second link 144. A second drum 154 may be integrally engaged to an engagement portion of the one end of the first link 142 and the transmission gear 135.

The first drum 152 and the second drum 154 may be connected with each other via a belt 156 or a chain to transmit rotational movement. A third drum 158 through which the belt 156 moves may be installed to the first link 142 to be rotatably supported. A diameter of the first drum 152 is smaller than that of the second drum 154, such that when the second drum 154 rotates in 360 degrees, the first drum 152 rotates in less than 360 degrees.

Referring to FIGS. 1 to 3, when the front door 1 and the rear door 2 fully are closed, the hook 100 is hanged to the central rail 10, the front door 1 and the rear door 2 cannot be opened without external manipulation.

If user pulls a door handle in order to open the front door 1 and/or the rear door 2, the front door 1 and/or the rear door 2 are released from door latches (not shown) and opened along the length of the vehicle, and the hook 100 is hanged to the central rail 10 still, user cannot slide the front door 1 and/or the rear door 2.

When the front door 1 and/or the rear door 2 are pushed outwardly in the width direction of the vehicle, the swing arm 70, the first link 142, and the second link 144 rotate together, and the lower slider 110 slides along the lower rail 20, such that the front door 1 and/or rear door 2 rotate with being pulled outwardly in the width direction of the vehicle.

Here, by operation force pulling the front door 1 and/or rear door 2 outwardly in the width direction of the vehicle, the second link 144 rotates, and the first link 142 and the first drum 152 rotate by the second link 144. The rotational movement of the second drum 152 rotates the input gear 133 through the transmission gear 135. Then, the rotational movement of the input gear 133 rotates the output gear 134 with an increased rotation speed through the gear shaft 131 and the planetary gear box 132, such that the output gear 134 moves along the rack gear 40 while being meshed with rack gear 40.

If the swing arm 70 continuously rotates by the continuous operation force of the user, the hook 100 is pressed down and rotates by the swing arm 70 to release a mutual restraint state of the central slider 50 and the central rail 10. In this state, user pushes the front door 1 forwardly in the longitudinal direction of the vehicle, the central slider 50 moves along the central rail 10, and the lower slider 110 also moves along the lower rail 20, such that the front door 1 slides to fully open.

Further, the central slider 50 of the rear door 2 moves along the central rail 10, the lower slider 110 of the rear door 2 moves along the lower rail 20, and the rear door 2 slides rearward in the longitudinal direction of the vehicle to fully open.

When the front door 1 and the rear door 2 are fully opened, the front door 1 and the rear door 2 can be maintained to be opened by a door latch (not shown), and the door latch can be released by the operation of the user, such that the front door 1 and the rear door 2 slide along forward and rearward along the longitudinal direction of the vehicle, respectively, to close and seal the door openings.

Figure 13:
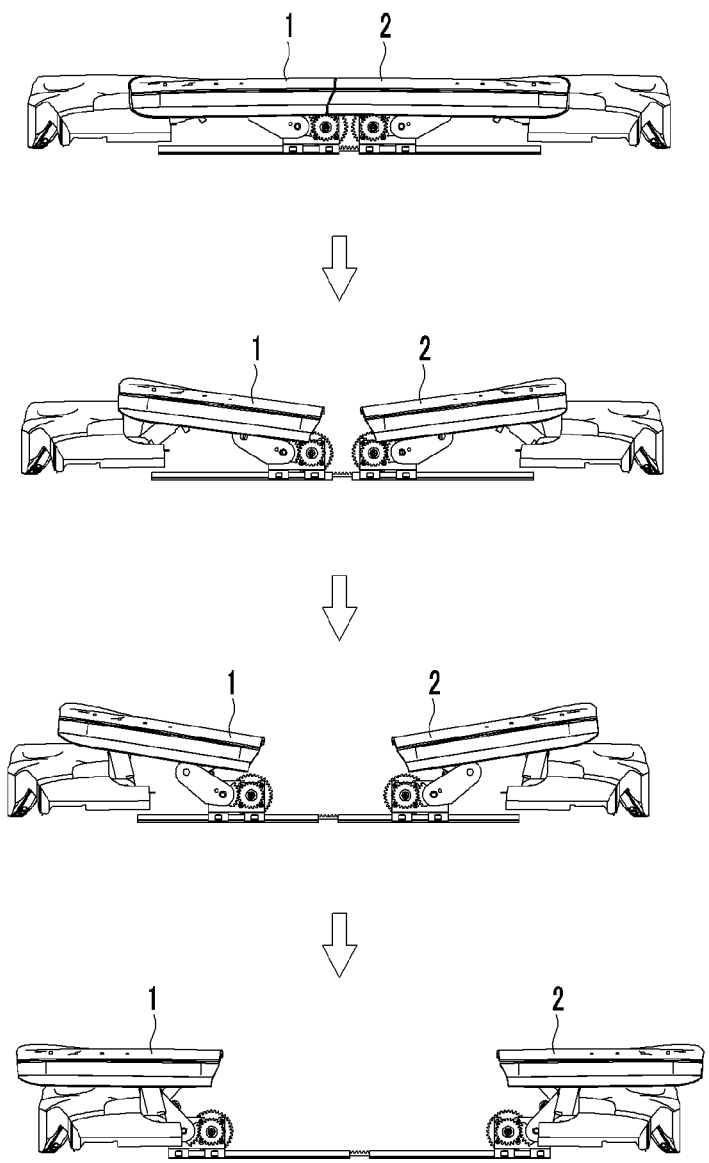
FIG. 13 represents a series of working conditions of a sliding door device for a vehicle according to an exemplary embodiment of the present inventive concept from a fully closed state to an opened state.

A series of working process of the front door 1 and the rear door 2 according to the exemplary embodiment of the present inventive concept are shown in FIG. 13, from a state in which the front door 1 and the rear door 2 are closed to a state in which the front door 1 and the rear door 2 are fully open.

While this inventive concept has been described in connection with what is presently considered to be practical exemplary embodiments, it is to be understood that the invention is not limited to the disclosed embodiments, but on the contrary, is intended to cover various modifications and equivalent arrangements included within the spirit and scope of the appended claims.

What is claimed is:

1. A sliding door device for a vehicle, comprising:
   a front or a rear door configured to be open closed;
   a central rail mounted on the front or the rear door and straightly extending in a sliding direction of the front or rear door;
   a central slider coupled to the central rail to support the central rail and to move along the central rail;
   a lower rail fixedly disposed below the front or rear door and straightly extending in the sliding direction of the front or rear door;
   a lower slider coupled to the lower rail to move along the lower rail;
   a central support structure having one end connected to the central slider and another end fixedly disposed to support the sliding movement of the central slider;
   a lower support structure having one end coupled to the lower slider and another end connected to a lower portion of the front or the rear door to movably support the lower portion of the front door or the rear door; and
   a hook locking and releasing the central support structure to and from the central rail,
   wherein the lower support structure includes: a gear device mounted at the lower slider; and a linkage of which one end is connected to the gear device and another end is connected to the front or the rear door,
   wherein the gear device includes: a rack gear mounted at the lower rail; a gear shaft; a planetary gear box through and into which the gear shaft penetrates and is inserted to be coupled thereto; an input gear coupled to an upper portion of the gear shaft to integrally rotate; an output gear coupled to a lower portion of the gear shaft to integrally rotate and meshed with the rack gear; and a transmission gear meshed with the input gear and mounted at the linkage, the transmission gear having an arc shape,
   wherein the linkage includes: a first link having a "U"-shaped cross section and one end thereof engaged with the transmission gear; and a second link having one end is connected to another end of the first link and another end of the second link is engaged with the lower portion of the front or the rear door, and
   wherein the first link and the second link include: a first upper flange and a first lower flange having a first penetrative assembling hole, respectively; and a first side flange connecting the first upper flange and the first lower flange and having a "U"-shaped cross section.

2. The sliding door device of claim 1, wherein each of the central rail and the lower rail comprises:
   a rail body having a rectangular plate shape; and
   two guide rails extending longitudinally along both edges of the central and lower rails and perpendicularly protruding from the rail body toward an inner side of the front or rear door.

3. The sliding door device of claim 2, wherein each of the two guide rails has a circular cross section.

4. The sliding door device of claim 3, wherein the lower rail is fixedly disposed below the front or rear door through a rail supporter.

5. The sliding door device of claim 1, wherein the central slider comprises:
   a slider body having a rectangular block shape into and to which a guide rail of the central rail is inserted and coupled;
   a roller rotatably inserted into the slider body and exposed to outside from one side of the slider body, the roller surface-contacting the guide rail of the central rail and moving the slide body along the guide rail.

6. The sliding door device of claim 5, wherein the central slider is mounted at an upper portion and a lower portion of the central rail, respectively, and integrally moves with a central slider mounting bracket.

7. The sliding door device of claim 6, wherein the central support structure includes:
   a vehicle body mounting bracket; and
   a swing arm of which one end is rotatably engaged to the vehicle body mounting bracket and another end is rotatably engaged to the central slider mounting bracket.

8. The sliding door device of claim 7, wherein the swing arm includes:
   an upper swing arm formed at an upper portion of the swing arm;
   a lower swing arm formed at a lower portion of the swing arm; and
   two flanges having a rectangular plate shape and connecting both edges of the upper swing arm and the lower swing arm;
   one of the two flanges presses the hook down.

9. The sliding door device of claim 8, wherein
   the upper swing arm and the lower swing arm have an assembling hole formed at both ends thereof, respectively; and
   the central slider mounting bracket has two fastening flanges inserted between and rotatably coupled to the upper swing arm and the lower swing arm.

10. The sliding door device of claim 8, wherein:
    the vehicle body mounting bracket has a "U"-shaped cross section formed by a second upper flange, a second lower flange, and a second side flange which connects the second upper flange and the second lower flange;
    the second side flange of the vehicle body mounting bracket includes at least one penetrative assembling hole and is fixedly disposed through the at least one penetrative assembling hole; and
    the second upper flange and the second lower flange of the vehicle body mounting bracket include a second penetrative assembling hole, respectively, such that a first pin is inserted into the second penetrative assembling holes of the second upper and lower flanges of the vehicle body mounting bracket and the assembling holes of the upper and lower swing arms to rotatably couple one end of the swing arm with the vehicle body mounting bracket.

11. The sliding door device of claim 7, wherein an elastic spring is interposed between the vehicle body mounting bracket and the swing arm to return the swing arm to its original position after rotating on the vehicle body mounting bracket.

12. The sliding door device of claim 7, wherein:
the hook includes a hook body and a hanger which is formed at one end of the hook body to removably hook onto the central rail; and
the hook is rotatably coupled to the swing arm and the central slider mounting bracket through a second pin.

13. The sliding door device of claim 1, wherein the front door and the rear door have lower edges formed with an engaging boss fastened with the other end of the second link, respectively.

14. The sliding door device of claim 1, wherein the other end of the first link and the one end of the second link are integrally fastened with a first drum;
the one end of the first link and the transmission gear are integrally fastened with a second drum; and
the first drum and the second drum are connected to each other via a belt or chain to transmit rotating movement.

15. The sliding door device of claim 14, wherein the first link includes a third drum through which the belt or chain passes.

16. The sliding door device of claim 14, wherein the first drum has a smaller diameter than that of the second drum; and
the planetary gear box configured to vary an output revolution of the output gear by increasing about 8 to 12 times of an input revolution of the input gear.

* * * * *